(12) United States Patent
Schmitt et al.

(10) Patent No.: US 8,675,184 B2
(45) Date of Patent: Mar. 18, 2014

(54) DIRECT DETECTION DOPPLER LIDAR METHOD AND DIRECTION DETECTION DOPPLER LIDAR DEVICE

(75) Inventors: Nikolaus Schmitt, Brunnthal-Otterloh (DE); Wolfgang Rehm, Hergensweiler (DE); Thomas Pistner, München (DE)

(73) Assignee: EADS Deutschland GmbH, Ottobrunn (DE)

( * ) Notice: Subject to any disclaimer, the term of this patent is extended or adjusted under 35 U.S.C. 154(b) by 333 days.

(21) Appl. No.: 13/002,483

(22) PCT Filed: Jun. 30, 2009

(86) PCT No.: PCT/EP2009/058216
§ 371 (c)(1),
(2), (4) Date: Apr. 18, 2011

(87) PCT Pub. No.: WO2010/000754
PCT Pub. Date: Jan. 7, 2010

(65) Prior Publication Data
US 2011/0188029 A1    Aug. 4, 2011

(30) Foreign Application Priority Data
Jul. 4, 2008    (DE) .......................... 10 2008 031 682

(51) Int. Cl.
*G01P 3/36*    (2006.01)
(52) U.S. Cl.
USPC .............................. 356/28; 356/28.5; 356/342
(58) Field of Classification Search
USPC .................................. 356/28, 28.5, 342, 336
See application file for complete search history.

(56) References Cited

U.S. PATENT DOCUMENTS

| | | | | |
|---|---|---|---|---|
| 3,697,887 A * | 10/1972 | Lee et al. | ......................... | 372/32 |
| 3,733,129 A * | 5/1973 | Bridges | ......................... | 356/5.09 |
| 3,811,774 A * | 5/1974 | Honeycutt et al. | ............ | 356/5.09 |
| 3,860,343 A * | 1/1975 | Janney et al. | .................... | 356/28 |
| 4,123,167 A * | 10/1978 | Botcherby et al. | .......... | 356/141.1 |
| 4,130,360 A * | 12/1978 | Courtenay | ................... | 356/3.03 |
| 4,195,931 A | 4/1980 | Hara | | |

(Continued)

FOREIGN PATENT DOCUMENTS

| | | | | |
|---|---|---|---|---|
| CA | 1103790 | * | 6/1977 | ................ G01S 9/62 |
| DE | 10316762 | * | 11/2004 | ................ G01P 5/26 |

(Continued)

OTHER PUBLICATIONS

Schmitt et al. "The AWIATOR airborne LIDAR turbulence sensor" Aerospace science and Technology 11 (2007) 546-552.*

(Continued)

*Primary Examiner* — Isam Alsomiri
*Assistant Examiner* — Assres H Woldemaryam
(74) *Attorney, Agent, or Firm* — Global IP Counselors, LLP

(57) ABSTRACT

The invention relates to a method for Doppler light detection and ranging (LIDAR) measurement of speeds. A laser beam is directed at the medium to be measured, and radiation which is then emitted by the medium is measured by a detector. In order to allow better control of the dynamic range of a direct reception Doppler LIDAR apparatus, a multiplicity of laser pulses can be transmitted per measurement, and a multiplicity of laser pulses can be received by the detector per measurement. A direct reception Doppler LIDAR apparatus can be suitable for carrying out the method.

24 Claims, 7 Drawing Sheets

(56) References Cited

U.S. PATENT DOCUMENTS

| | | | |
|---|---|---|---|
| 4,209,253 A * | 6/1980 | Hughes | 356/139.08 |
| 4,373,808 A * | 2/1983 | Pell et al. | 356/139.03 |
| 4,643,564 A | 2/1987 | Löfgren et al. | |
| 4,647,204 A * | 3/1987 | Honeycutt et al. | 356/459 |
| 4,902,125 A * | 2/1990 | Keene et al. | 356/5.09 |
| 4,928,152 A * | 5/1990 | Gerardin | 356/5.09 |
| 5,056,914 A | 10/1991 | Kollodge | |
| 5,221,956 A * | 6/1993 | Patterson et al. | 356/28 |
| 5,434,662 A | 7/1995 | Rockwell et al. | 356/4.01 |
| 5,510,890 A * | 4/1996 | Langdon et al. | 356/5.09 |
| 5,808,743 A * | 9/1998 | Stephens et al. | 356/614 |
| 6,184,981 B1 * | 2/2001 | Hasson et al. | 356/303 |
| 6,856,396 B2 * | 2/2005 | McGuire | 356/450 |
| 7,495,774 B2 * | 2/2009 | Hays et al. | 356/519 |
| 7,499,181 B2 * | 3/2009 | Mirand et al. | 356/519 |
| 7,505,145 B2 * | 3/2009 | Hays et al. | 356/519 |
| 7,508,528 B2 * | 3/2009 | Hays et al. | 356/519 |
| 7,518,736 B2 * | 4/2009 | Hays et al. | 356/519 |
| 7,522,291 B2 * | 4/2009 | Hays et al. | 356/519 |
| 7,933,002 B2 * | 4/2011 | Halldorsson | 356/28 |
| 8,035,888 B2 * | 10/2011 | Baillon et al. | 359/326 |
| 8,072,584 B2 * | 12/2011 | Caldwell et al. | 356/28.5 |
| 8,125,622 B2 * | 2/2012 | Gammenthaler | 356/28 |
| 8,355,120 B2 * | 1/2013 | Englert et al. | 356/28.5 |
| 8,390,791 B2 * | 3/2013 | Vert et al. | 356/4.01 |
| 2002/0036766 A1 * | 3/2002 | Krawczyk et al. | 356/28.5 |
| 2006/0139657 A1 * | 6/2006 | Baillon et al. | 356/519 |
| 2006/0227317 A1 * | 10/2006 | Henderson et al. | 356/28 |
| 2006/0262324 A1 | 11/2006 | Hays et al. | |
| 2007/0171397 A1 * | 7/2007 | Halldorsson et al. | 356/28.5 |
| 2008/0043234 A1 | 2/2008 | Mirand et al. | |
| 2008/0117433 A1 | 5/2008 | Hays et al. | |
| 2009/0073417 A1 * | 3/2009 | Urata et al. | 356/28.5 |

FOREIGN PATENT DOCUMENTS

| | | |
|---|---|---|
| EP | 0111438 A1 | 6/1984 |
| EP | 1756620 B1 | 1/2008 |
| GB | 2000411 A | 1/1979 |

OTHER PUBLICATIONS

Durand et al., "Aladin airborne demonstrator: a dropper wind lidar to prepare esa's adm-aeolus explorer mission" Proc of SPIE, [Online] vol. 6296, 2006.

Schmitt et al., "The AWIATOR airborne LIDAR turbulence sensor" Aerospace Science and Technology, Editions Scientifiques ET Medicals Elsevier, vol. 11, No. 7-8, Nov. 1, 2007.

German Office Action of corresponding German Application No. 10 2008 031 682.2, dated May 5, 2009.

International Search Report of corresponding International Application No. PCT/EP2009/058216, dated Nov. 11, 2009.

Written Opinion of the International Search Authority of corresponding International Application No. PCT/EP2009/058216, dated Nov. 11, 2009.

* cited by examiner

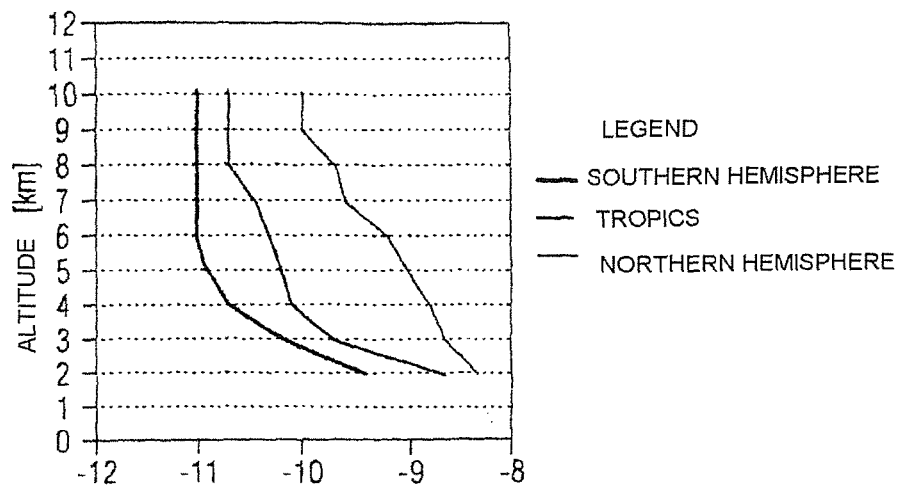
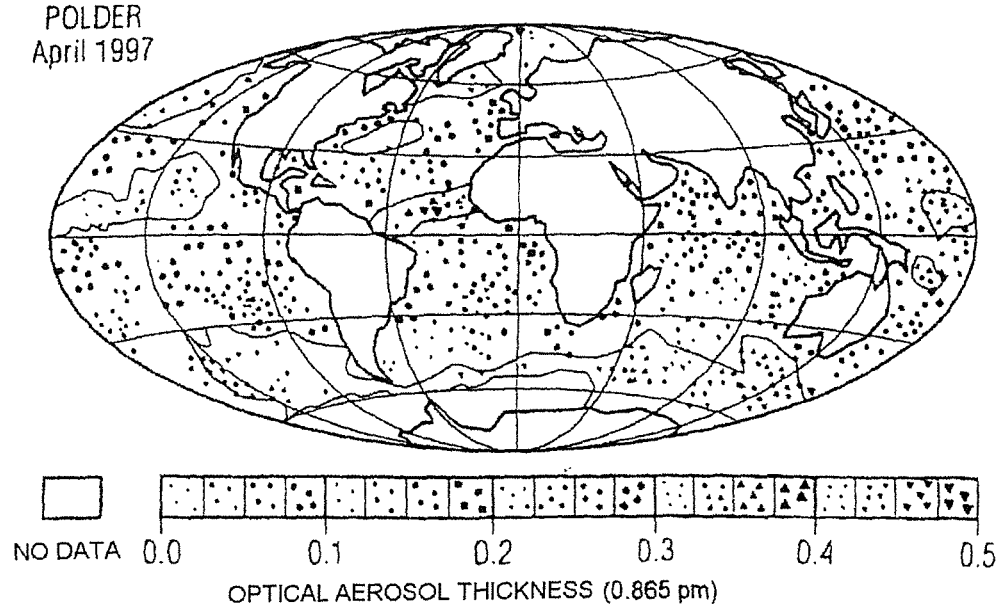

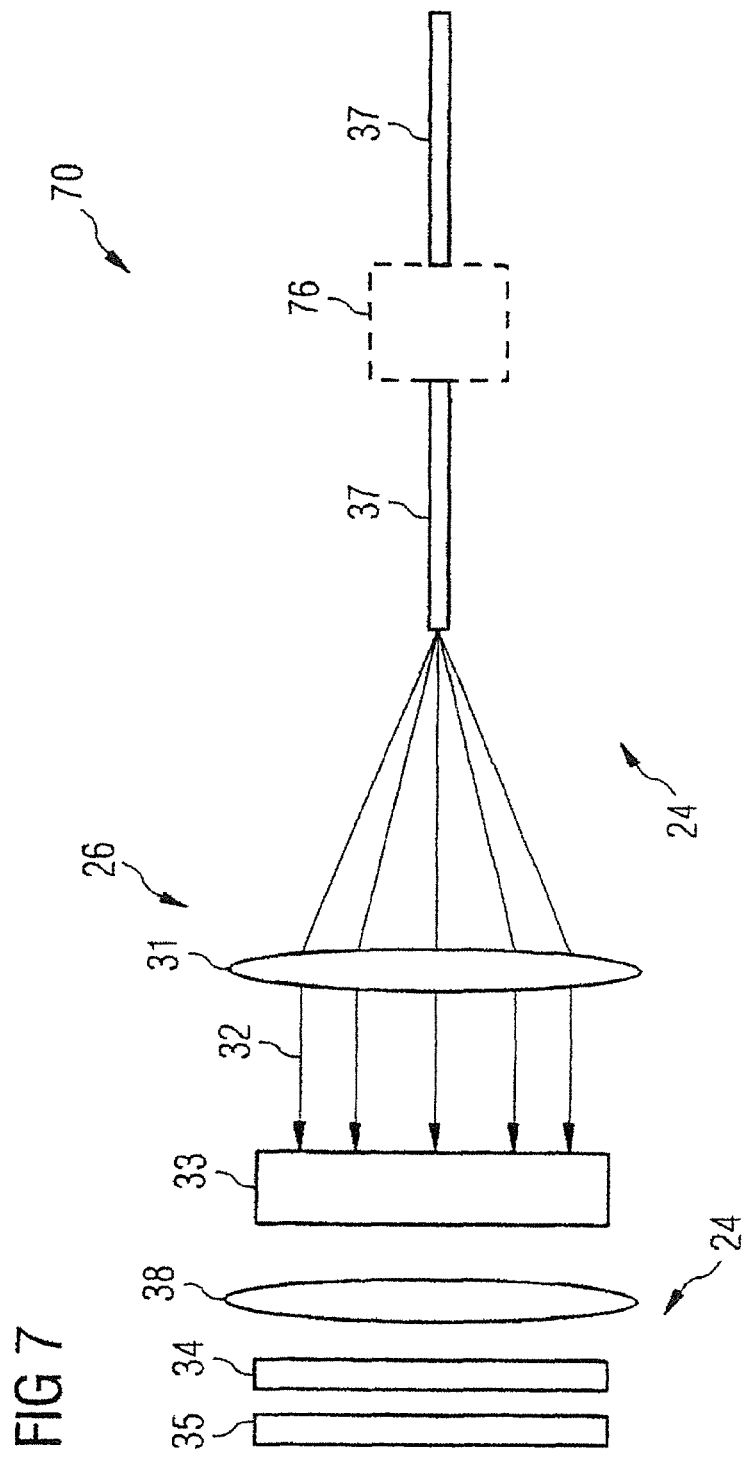

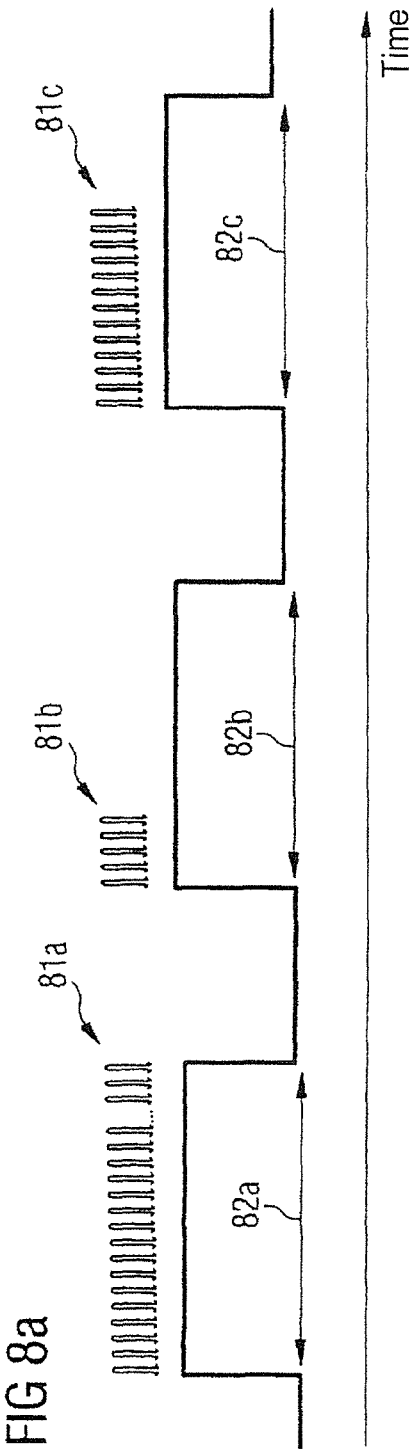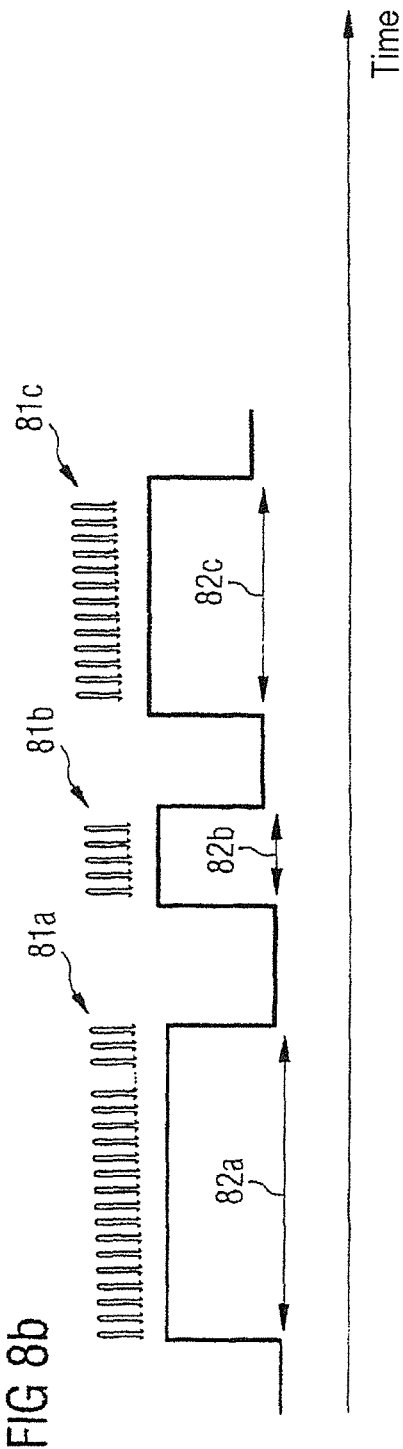

DIRECT DETECTION DOPPLER LIDAR METHOD AND DIRECTION DETECTION DOPPLER LIDAR DEVICE

CROSS-REFERENCE TO RELATED APPLICATIONS

This U.S. National stage application claims priority under 35 U.S.C. §119(a) to German Patent Application No. 10 2008 031 682.2, filed in Germany on Jul. 4, 2008, the entire contents of which are hereby incorporated herein by reference.

BACKGROUND

1. Field of the Invention

The invention relates to a method for Doppler LIDAR measurement of speeds by means of direct reception, and to an apparatus for carrying out the method.

LIDAR is short for "light detection and ranging" and is a method, which is closely related to radar ("radio-wave detection and ranging"), for range and speed measurement, as well as for remote measurement of atmospheric parameters. However, laser beams are used instead of radio waves, as in the case of radar.

One example of a Doppler LIDAR apparatus and of a method which can be carried out using it for measuring wind speeds is known from EP1756620 B1, US 20080117433 A1 or US 2006262324 A1.

In the case of direct reception Doppler LIDAR apparatuses, laser radiation is directed at the medium to be measured, and the radiation which is then reflected is received directly and is investigated for a Doppler shift in the laser wavelength, in order in this way to determine relative speeds.

Doppler LIDAR systems using direct reception technology are used, for example, for predictive measurement of turbulence, cross winds or vortex trains in front of an aircraft, in particular an airplane. In addition to a pure warning function, the measurement signals can in particular also be injected directly into the flight control system of the aircraft, in order, for example, to proactively regulate out gusts, cross winds or vortex train influences, that is to say before the aircraft reacts negatively to the external flow change, such that a constant smooth flight state is maintained, loads on the aircraft are reduced, and the safety in the aircraft and for the aircraft remains ensured.

One major problem in this case is the dynamics which occur in the back-scattering intensity. The intensity of the back-scattered signal can easily vary by three orders of magnitude because of the aerosol content and the air density. A major variation also occurs if the aircraft, for example an airplane, in which the LIDAR measurement system is located is flying through cloud banks, as a result of which the overall dynamics can easily amount to four to five orders of magnitude.

2. Background Information

Today's detectors have a very much narrower dynamic range. For example, CCD arrays which are used for so-called fringe imaging technology typically have a dynamic range of 10 to 12 bits. Based on a minimum intensity of 6 to 7 bits, the remaining dynamics are about one or two orders of magnitude.

Attenuation of the received signal, by way of example using electrooptical modulators, is highly complex, expensive and is difficult to achieve because of the normally large apertures for CCD chips.

SUMMARY

An object of the invention is to provide a method for increasing the dynamic range of a Doppler LIDAR system with direct reception, and to provide a direct reception Doppler LIDAR apparatus with a larger dynamic range.

According to the invention, a multiplicity of laser pulses are directed at the medium to be measured, per measurement. In the measurement, a multiplicity of laser pulses which then come from the medium, i.e. in general scattered laser pulses, are detected by a detector, and are integrated there.

The measurement method is preferably carried out very quickly, corresponding to the preferred application on board aircraft. By way of example, the duration of a measurement cycle varies in the order of magnitude of a few milliseconds. A number of laser pulses which is greater by at least one to two orders of magnitude (that is to say for example greater by a factor of at least 5-10) are emitted, that is to say for example in the kilohertz range.

In one particularly preferred refinement of the method according to the invention and of the apparatus according to the invention, a high-repetition-rate laser is used rather than a single pulse from the laser per measurement (flash laser, typically 10-100 Hz) for LIDAR measurement, transmitting several hundred pulses per measurement (in particular micropulse laser, typically 5-50 kHz). Since it is not the light phase but only the frequency and intensity which are important for the direct reception method, the detection of one powerful laser pulse corresponds to the detection of a large number of weak laser pulses, which are appropriately integrated on the detector.

Furthermore and preferably, the number of light pulses integrated on the detector is controlled such that a greater or lesser number of pulses are integrated depending on the intensity of the respective back-scattered radiation, in order to ensure an optimum overall intensity on the detector—that is to say for example above the required minimum intensity, but considerably below the saturation intensity.

The proposals according to the invention make it possible to design a direct reception LIDAR system by means of which LIDAR back-scattered signals with a dynamic range of several orders of magnitude can be detected by one detector without disturbing saturation of the detector, and with the detector having a dynamic range which is several orders of magnitude narrower than would be necessary for the measurement task.

In one preferred refinement, in the case of the method for measuring speeds, for example the air speed, using the direct reception technique, it is proposed that a high-repetition-rate laser with a repetition rate of one or more orders of magnitude above the detection rate be used for measurement. It is also preferable for a plurality of laser pulses to be integrated on one light-sensitive detector, in order to form an individual measurement.

In one preferred refinement, the number of laser pulses gathered on the detector can be varied. This can be done in various ways, which can be carried out individually or cumulatively.

By way of example a laser source can be controlled in an appropriate manner for transmission of a defined, variable number of pulses. In another refinement, the laser source which, for example, is formed by a laser is followed by a correspondingly controllable switch. In a further refinement, the detector is correspondingly controllable, such that received laser pulses are masked out and are not integrated. In another variant, a correspondingly controllable switch is arranged in front of the detector. The control process is preferably carried out such that a high signal intensity is achieved but overdriving of the detector is avoided by varying the number of integrated laser pulses, going well beyond the dynamics of the pure detector when the laser signal back-scattering conditions are varying on the scattering object, in order to provide a measurement system with a correspondingly increased dynamic range.

The direct reception Doppler LIDAR apparatus according to the invention is preferably designed to carry out the method according to the invention. The direct reception Doppler LIDAR apparatus is preferably a Doppler LIDAR system for measuring speeds, for example the air speed, using the direct reception technique, in which a high-repetition-rate laser with a repetition rate one or more orders of magnitude greater than the detection rate is used for measurement. Furthermore, the detector is preferably designed and/or controlled such that a plurality of laser pulses on one light-sensitive detector are integrated to form an individual measurement. An intensity control device is preferably provided, in order to vary the number of laser pulses gathered on the detector. This intensity control device is furthermore preferably designed such that either the laser is controlled appropriately to transmit a defined, variable number of pulses, or the laser is followed by a correspondingly controllable switch, or the detector is correspondingly controlled, or received laser pulses are masked out and are not integrated, or a correspondingly controllable switch is positioned in front of the detector. The control process is preferably carried out such that a high signal intensity is achieved, but overdriving of the detector is avoided, by varying the number of integrated laser pulses. This allows correspondingly increased dynamics to be achieved for the measurement system, well beyond the dynamics of the pure detector, particularly when the laser signal back-scattering conditions on the scattering object are changing.

In a further preferred refinement of the method and/or of the apparatus, a current measurement signal is used to calculate or determine whether the intensity was too low or too high. The number of pulses to be integrated for the next measurement is then correspondingly increased or decreased. Furthermore, this process is preferably repeated consecutively, until the intensity is neither too high nor too low.

The number of pulses may be reduced or increased by a constant factor or by a constant additive amount. Alternatively, the number of pulses can be reduced or increased in proportion to the discrepancy from the ideal value.

In a further preferred refinement of the invention, a prediction for the intensity to be expected from the next measurement is estimated from the profile of the intensity rise or fall, and the number of laser pulses to be integrated is determined from this.

When there are a plurality of different measurement channels, for example for a plurality of measurements in different directions, this determination can in each case be carried out separately for each channel. In a refinement with a reference channel, this calculation can be carried out for the reference channel, independently of the measurement channels.

In one preferred refinement, a camera or a camera chip is used as a detector. In a further refinement, a photodiode or a one-dimensional or two-dimensional photodiode array is used as a detector.

According to one advantageous refinement of the invention, the reading can be carried out on a fixed clock cycle independently of the number of integrated laser pulses. In another advantageous refinement of the invention, the reading is carried out after reaching the required intensity, but if appropriate limited to a maximum time.

The number of laser pulses to be integrated is controlled in one refinement, in which the number of laser pulses emitted by the laser source is controlled, for example via a Q-switch for the laser source.

Alternatively or additionally, the number of laser pulses to be integrated can be controlled via an electrooptical switch, electromechanical switch or fiber-optic switch arranged downstream from the laser.

The laser pulses to be integrated are preferably controlled at the receiving end. For this purpose, by way of example, the number of laser pulses to be integrated can be controlled via an electrooptical switch in front of the detector, or via a fiber-optic, electrooptical switch arranged in front of the detector. The number of laser pulses to be integrated is particularly preferably controlled via a switchable microchannel plate. In a further refinement of the invention, the number of laser pulses to be integrated is controlled via an electronic circuit of the detector output, or corresponding control of the camera chip.

According to one advantageous development of the invention, the number of integrated laser pulses is detected by means, for example, of a counter, and is used together with the intensity of the measurement signal to determine the actual signal amplitude.

BRIEF DESCRIPTION OF THE DRAWINGS

Exemplary embodiments of the invention will be explained in more detail in the following text with reference to the attached drawings, in which:

FIGS. 2a, 2b show the back-scattering intensity on air aerosols locally (FIG. 2a) and plotted against the altitude for the northern hemisphere, the southern hemisphere and the equator (FIG. 2b) (POLDER data, 1997);

FIG. 7 shows a further exemplary embodiment of a detector arrangement which, in comparison to that shown in FIG. 3, has had a fiber-optic switch added; and FIGS. 8a, 8b show illustrations of a constant (FIG. 8a) and a variable (FIG. 8b) exposure time of the detector for different numbers of pulses to be integrated.

DETAILED DESCRIPTION OF EMBODIMENTS

Figure 1:
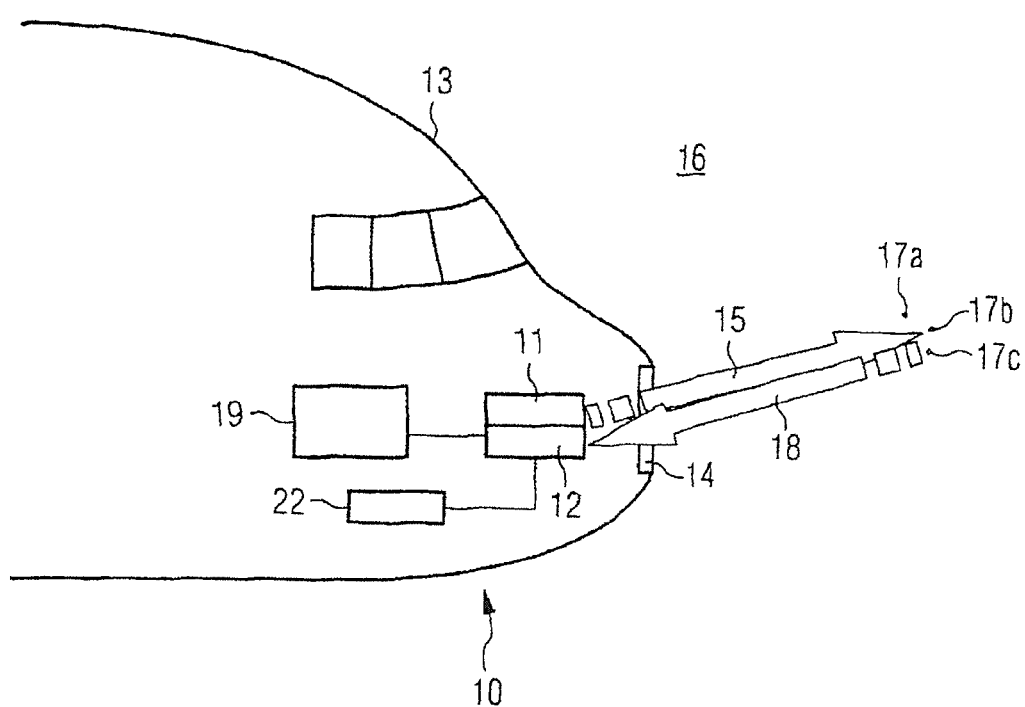
FIG. 1 shows a schematic illustration of a LIDAR apparatus carried on an aircraft.

FIG. 1 shows a schematic illustration of a direct reception Doppler LIDAR apparatus 10. The direct reception Doppler LIDAR apparatus 10 in the illustrated example is installed in an aircraft, illustrated using the example of an airplane 13.

The direct reception Doppler LIDAR apparatus 10 has a laser source 11 with a relatively narrow bandwidth (single-frequency operation, typical line width several MHz). The light from the laser source 11—transmitted laser beam 15—is transmitted through a window 14 into the atmosphere 16. In the atmosphere 16, the light from the laser source 11 is elastically scattered on particles 17a, 17b, 17c, . . . in the air, in the case illustrated by way of example here. The scattered light 18 is recorded by a detector arrangement 12. The relative speed is determined in an evaluation device 19 from the Doppler shift of the scattered light 18, which has been scattered back on the scatter particles 17a, 17b, 17c, which move relative to the direct reception Doppler LIDAR apparatus 10.

An intensity control device 22 is also provided for the illustrated direct reception Doppler LIDAR apparatus 10, in order to control the intensity to be received by a detector in the detector arrangement 12.

With regard to scattering on the particles 17a, 17b and 17c, a distinction is in this context drawn on the one hand between scattering on molecules in the air (Rayleigh scatter) and scattering on aerosols (dust particles, salt particles etc., Mie scatter). Rayleigh scatter can be measured reliably in all atmospheric layers and independently of meteorological influences; it is dependent only on the particle density, which decreases continuously toward greater heights. In contrast, scattering on aerosols is very highly dependent on their local density, which can vary greatly locally and in particular as a function of weather influences and other influences.

FIGS. 2a and 2b show different aerosol scatters and aerosol distributions. By way of example, the aerosol scatter is very strong in regions with high hazardous-substance emissions, for example in industrial regions or volcanic regions. In contrast, the aerosol scatter is quite low in the area of large waterways, for example over the oceans or in the area of the southern hemisphere of the earth, see FIG. 2a. However, in particular, the aerosols are also washed out, for example by heavy rain, as a result of which their concentration can then be very low.

Overall, the Mie scatter, which is based on the aerosol density, decreases more than proportionally in comparison to the Rayleigh scatter on molecules in the air for an altitude of more than 2 km; see FIG. 2b. Below an altitude of 2 km such as this, the Mie scatter is extremely environmentally dependent, and in some cases may be very strong or else very weak. The Rayleigh scatter decreases in proportion to the density, that is to say to about 30% at an altitude of 10 km. A measurement based purely on aerosols is therefore not suitable for reliable measurement of turbulence, etc., and it should also be possible to measure the Rayleigh scatter.

Since the intensity of the Rayleigh scatter is proportional to the reciprocal of the wavelength to the fourth power, it is worthwhile using a laser source 11 with the shortest possible wavelength, that is to say for example in the UV range.

Figure 3:
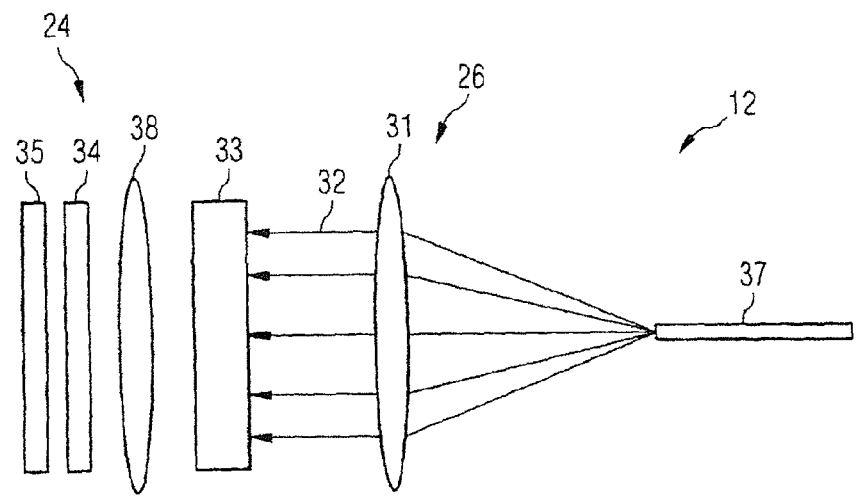
FIG. 3 shows a schematic illustration of a detector arrangement which can be used for the apparatus shown in FIG. 1.

One example of the detector arrangement 12 of the direct reception Doppler LIDAR apparatus 10 is illustrated in more detail in FIG. 3. The scattered radiation—scattered light 18—is passed via optics 26 to a detector 35, and is detected.

In principle, two measurement methods can be used to measure a frequency shift. In one measurement method, which will not be discussed here, the so-called coherent detection, the fixed phase relationship between the transmitted laser beam with a sufficiently narrow line width and the received scattered radiation is made use of. Because of the coherence, this measurement method is highly sensitive. In order to measure the frequency shift, a portion of the laser beam is diverted into the atmosphere before transmission, is delayed, and is mixed collinearly with the received scattered radiation on a photodetector with a sufficiently wide bandwidth. Because of the nonlinearity of the photodetector, the differential frequency can be directly tapped off as an electrical signal, and corresponds directly to the Doppler shift and is therefore proportional to the relative speed.

One precondition for this measurement method is that the laser source has a sufficiently narrow bandwidth, such that the coherence length of the light is greater than the path-length difference between the delayed reference radiation and the received scattered radiation. Furthermore, the scattered radiation must not itself contribute to any significant line broadening since, otherwise, the coherence would be destroyed. Typical limit values for the maximum line width and broadening in the case of scattering are in the region of a few kHz or MHz.

Although the radiation scattered on aerosols now has virtually the same narrow bandwidth as the incident radiation, this does not apply, however, to the radiation which has been scattered on molecules: because of the Boltzmann distribution of the particle velocities, the very light molecules move at high speed (Brownian molecular motion) at normal temperatures well above absolute zero, and this leads to a considerable Doppler broadening, solely because of this effect. Typical values are in the region around 3 GHz. Coherent detection using the method described above (mixing on a photodetector) is therefore impossible for the measurement method of interest here.

Therefore, in the method described here and in the direct reception Doppler LIDAR apparatus 10 described here, the so-called direct reception technique as illustrated in FIG. 3 is used to measure the Rayleigh scatter (scatter on molecules) which does not require the phase of the radiation and involves only an intensity measurement. In order to determine the Doppler frequency shift, a further element is provided, which has frequency discrimination or wavelength dispersion.

In the case of the detector arrangement 12 illustrated in FIG. 3, the received radiation 32 is supplied to the detector arrangement 12 for this purpose by means of an optical fiber 37. The received radiation is supplied via first optics—collimation optics 31—to a so-called Fabry-Perot interferometer 33, which has two plane-parallel, partially reflective plates or a single plane-parallel plate with partial reflection on both surfaces, and this leads to the wave interfering with itself, by self-superimposition of the wave in a resonator.

This results in a spatial intensity distribution by imaging by means of second optics 38 on the detector 35. In the illustrated example, multiple reflection results in a circular interference figure—so-called rings or fringes, see FIG. 4. Maxima and minima in this case each correspond to superimpositions of the same angle. A change in the radius of this interference pattern is directly proportional to the change in the wavelengths or frequency change of the detected signal, and therefore to the change in the Doppler shift, and therefore the change in the relative velocity of the scatter particles, that is to say for example the scatter particles 17a, 17b, 17c in the air (molecules, aerosols) with respect to the measurement system. By way of example, in the case of systems carried on aircraft, it is therefore also possible to determine the relative velocity of the air with respect to the aircraft 13.

If the radii of the interference pattern are compared, for example, with a signal measured at the same time or at a different time, of the directly derived laser signal, then it is also possible to determine the absolute relative velocity (in contrast to the change in the relative velocity as described above). If this measurement is carried out at the same time or successively in different spatial directions (transmission of the laser beam in different spatial directions and measurement of the back-scattering from this), then the two-dimensional or else three-dimensional relative velocity vector can be determined. The principles and solutions proposed here can be used in a corresponding manner for one or more measurement directions.

Instead of the Fabry-Perot interferometer described here, it is also possible to use other frequency-discriminating elements or other interferometers, for example a Michelson interferometer, Fizeau interferometer, or the like.

Figure 4:
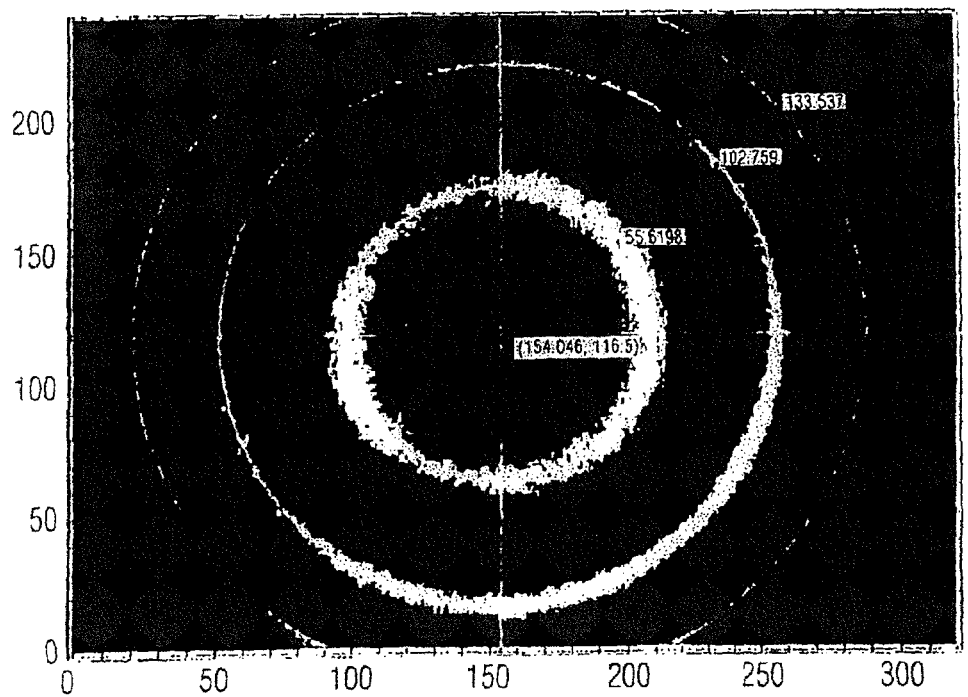
FIG. 4 shows an example of an interferogram recorded using the detector arrangement shown in FIG. 3.

This interference pattern, illustrated as an example in FIG. 4, can now be recorded using a suitable detector 35, see FIG. 3. The detector 35 may be designed differently. Different solutions include the use of filters on the edges of the interference maxima, concentric annular electrodes, which are sensitive to the interference pattern, of a photomultiplier, conversion of the circular pattern to a linear pattern, for example by means of fiber optics, and detection using a CCD line-scan detector, or detection using a two-dimensional photodetector (for example CCD camera). All of these detectors, as well as others, are suitable for the described direct reception Doppler LIDAR apparatus 10. However, for the sake of simplicity, the direct reception Doppler LIDAR apparatus 10 as well as a measurement method which can be carried out using it will be described in more detail using the example of the use of a CCD camera as a detector 35 with a microchannel plate 34 for amplification in front of it.

The detected back-scattered signal is typically very weak, but its intensity may fluctuate to a major extent, on the one hand because of changes in the air density and therefore the number of back-scattering molecules in the measurement volume, and on the other hand because of aerosols located in the measurement volume.

It should be noted that the direct reception detection method described here and the direct reception Doppler LIDAR apparatus 10 described here always allow measurement in an atmosphere in which there is no aerosol whatsoever (pure Rayleigh scatter) and that, furthermore, scatter on aerosols can also be detected and evaluated. In this case, it is even possible to expect a very strong back-scattered signal.

While the differences resulting from the air-density changes typically amount to one order of magnitude or less (depending on the maximum flying altitude), the fluctuations caused by back-scattering when aerosol is present or there is little aerosol, amount to several orders of magnitude (extreme cases: cumulus cloud and high flying altitude), as a result of which the detected signal may fluctuate overall by several orders of magnitude.

Furthermore, the back-scattering intensity can likewise fluctuate during measurement range and measurement depth switching.

These possible fluctuations in the measurement signal by several orders of magnitude are typically well beyond the dynamic range of the sensors of the detector 35. In the case of the measurement method described here, further measures are taken in order to achieve the required dynamic range.

A first, obvious solution would be to attenuate the received signal as a function of its intensity. However, this obvious solution is disadvantageous for a number of reasons: absorbent attenuators might need to be moved mechanically. Electrically controllable attenuators are generally based on the transmission of polarized light while, in contrast, the received back-scattered signal is at most partially polarized and, furthermore, elements which do not maintain polarization are generally used for beam transmission. Furthermore, the precise value of the attenuation will be important for determination of certain parameters (calculation back to the actual signal intensity), which could be determined only with difficulty in the case of absorbers or other attenuators.

Figure 6A:
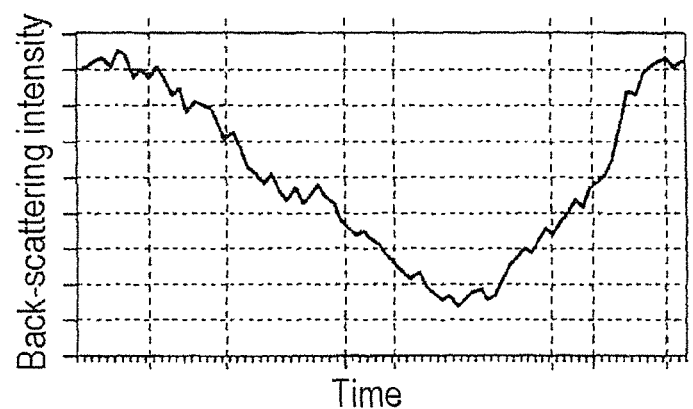
FIG. 6a shows an illustration of a typical intensity profile plotted against the time.

A different solution approach is therefore proposed, in order to considerably widen the dynamic range of the input signal (sketched as the intensity plotted against the time in FIG. 6a). A further aim is advantageously to allow a defined attenuation in digital form such that, furthermore, the exact signal intensity can also be calculated back from the detected intensity and the digitally defined attenuation ratio. Furthermore, in advantageous refinements of the direct reception Doppler LIDAR apparatus 10 and of the direct reception Doppler LIDAR measurement method which can be carried out using it, disturbance parameters such as background light etc., can also be minimized.

One fundamental principle of the direct reception Doppler LIDAR apparatus 10 proposed here and of the method which can be carried out using it is based not on using individual pulses for each measurement in the normal manner for speed measurement, but on using pulse trains or a large number of laser pulses (FIGS. 5a and b) of a high-repetition-rate laser (typically in the kHz range), which are integrated on the detector 35 to form a single measurement. This is illustrated schematically in FIGS. 5a and 5b, in which the laser pulses 51 and the measurement interval 52 (duration of the measurement cycle) are illustrated against the time. The exposure times are in this case typically around 10 milliseconds per measurement, or more generally between about 1 ms and 100 ms.

Figure 5A:
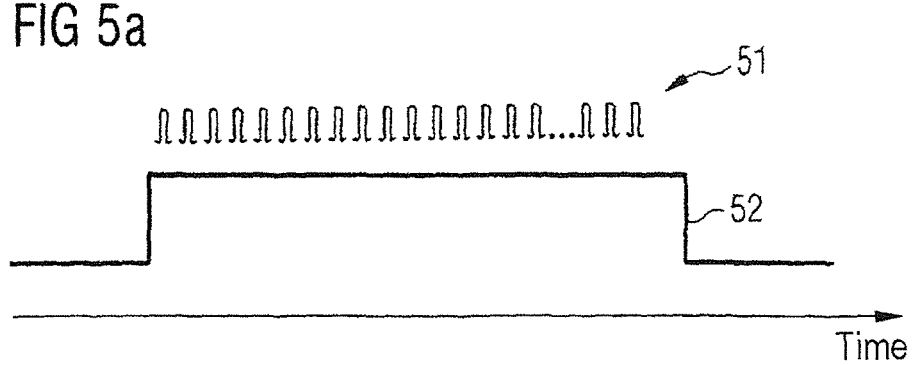
FIGS. 5a, 5b show illustrations of the regulation of laser pulses to be integrated, for a predetermined exposure time.
Figure 5B:
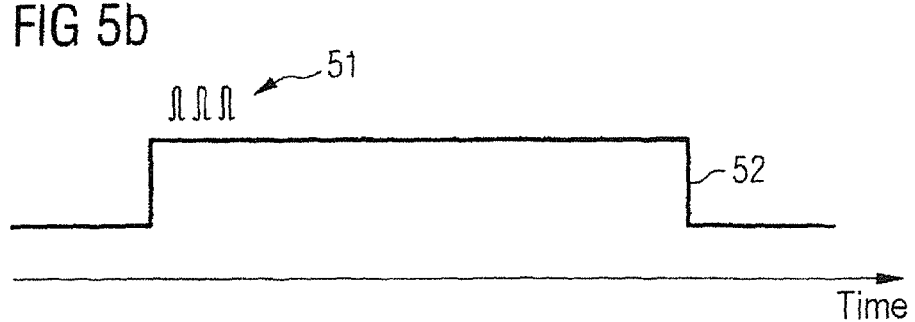

In the exemplary embodiment of the measurement method for speed measurement as described here by means of a direct reception Doppler LIDAR, the controllable switching device 24 is also used, which is controlled such that the number of integrated laser pulses 51 can be controlled. To illustrate this, FIG. 5a shows a large number of laser pulses 51 for each measurement 52 with little back-scatter, and FIG. 5b shows a small number of laser pulses 51 for each measurement 52 with strong back-scatter.

By way of example, a number of laser pulses 51, which number can be defined but can be selected individually for each measurement, are integrated as a function of the received back-scattering intensity. In one alternative procedure, the detector 35 is itself controlled appropriately, to the extent to which it can be controlled. A further procedure for controlling the laser pulses 51 to be integrated includes control of the detector output.

Figure 6B:
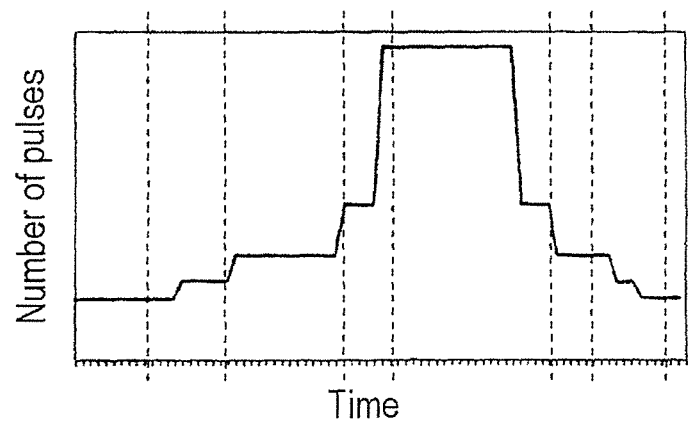
FIG. 6b shows an illustration of the number of pulses to be integrated, in relation to FIG. 5b.
Figure 6C:
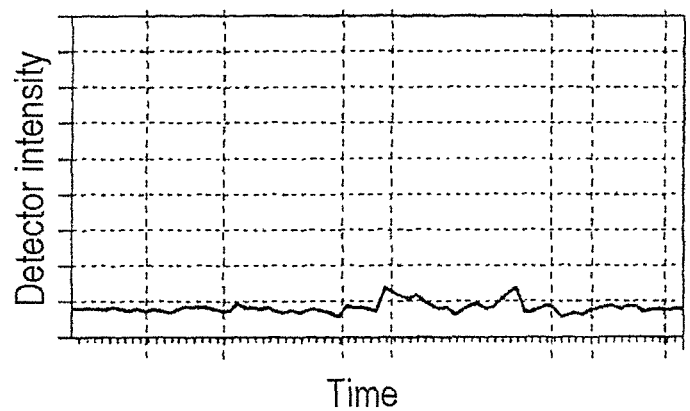
FIG. 6c shows an illustration of the intensity arriving at the detector after regulation of the number of pulses to be integrated.

To illustrate this, FIG. 6a shows a received back-scattered signal with a wide dynamic range, FIG. 6b shows the number of laser pulses 51 to be detected in each case, and FIG. 6c shows the relatively uniform intensity on the detector 35.

This prevents overdriving of the detector 35. At the same time, an optimum number of pulses are integrated when the signals are relatively weak. The intensity is reduced in defined steps of individual laser pulses, such that the measured intensity need be calculated back only to the complete number of pulses for reconstruction of the actual back-scattered intensity.

One preferred arrangement provides, for example, a laser pulse rate of 20 kHz for detector exposure times (integration times) of 16 ms per measurement, thus allowing up to 333 pulses to be integrated for one measurement in this case. When the back-scattering is very strong, the number of pulses to be integrated can be reduced to a single pulse. In addition to the dynamic range of the detector 35, this results in a further dynamic range of more than 333, which can be multiplied by the detector dynamic range to produce the overall system dynamic range. Typical values for the detector dynamic range are about 100; the overall dynamic range is then up to more than four orders of magnitude.

This arrangement is particularly advantageous, particularly when using a switching device 24 in front of the detector 35. In the example illustrated in FIG. 3, a switching device 24 such as this is formed essentially by a microchannel plate 34 which can be switched very quickly.

FIG. 7 illustrates an embodiment of a detector arrangement 70 which has been extended in comparison to the embodiment of the detector arrangement 12 shown in FIG. 3, and in which the same reference numbers have been used for corresponding elements. In FIG. 7, the switching device 24 has the microchannel plate 34 in front of the detector 35 (for example in front of a CCD camera) as well as a fiber-optic or electrooptical switch 76 in the reception path of the optical fiber 37. The microchannel plate 34 may also be omitted or may be used for a different function, for example as an intensity amplifier.

The intensity control device 22 accordingly controls the number of laser pulses passing through to the detector 35, by means of the switching device 24 which is arranged in front of the detector 35. Alternatively or additionally, the intensity control device 22 controls the number of pulses to be integrated, by controlling the detector 35 itself.

The switching time for detection can now also actually be selected in the various described manners to be so short that the expected and desired scattered signal is recorded, although no detection takes place before or after this, thus making it possible to minimize the background light influence.

With regard to the microchannel plate 34, which can be switched quickly, it should be noted that this can preferably be switched either by controlling the acceleration voltage or by controlling a gate electrode, generally an electrode in the form of a network on the photocathode, or by both at the same time. The switching times are typically in the nanosecond range, or less (at least for the gate electrode).

Another embodiment, which is not illustrated in any more detail in the drawings and which does not have the above-mentioned advantage of minimizing the background light influence, but which can likewise be used, is an arrangement in which the number of laser pulses transmitted is controlled (in contrast to controlling the number of received laser pulses, as described above). This can once again be achieved either by inherent control of the laser (for example by means of a Q-switch, which is not illustrated, in the laser source 11) or by a high-speed switch fitted at the laser output (electrooptical switch, fiber switch; likewise not illustrated).

According to one exemplary refinement of the direct reception Doppler LIDAR apparatus 10 and of the measurement method, in order to determine the desired number of pulses to be detected, the intensity at the detector 35 can be measured and, correspondingly, no more pulses can be integrated (for example the switch 76 can be closed, with the microchannel plate 34 being switched appropriately, or the like) when the required intensity is reached. However, in the case of a CCD camera, this intensity measurement is not possible during integration since the CCD chip must be read in order to determine the intensity. However, one option is to use the intensity of the respective last measurement cycle for intensity measurement and to determine the nominal number of pulses to be integrated for the next detection on this basis (which may be greater than, less than or equal to the previous number of pulses). When measurements are carried out in a plurality of measurement directions, this must be done separately for each measurement direction.

If a reference signal is furthermore also measured (direct laser signal) from time to time, this method can also be carried out for the reference signal, and an optimum detector intensity can be achieved even if the laser power is fluctuating. The described method of using the respective last measured value works well whenever the intensity changes are slow in comparison to the measurement rate. Rapid intensity changes can therefore not be detected, or at least cannot be detected completely. It is then always possible for one measurement nevertheless to be outshone, or to have an excessively low intensity. in this case, the described procedure must be repeated consecutively until the desired sensitivity range is reached, or else a relatively major sudden change must be provided on the basis of an estimate. However, this is adequate for typical applications. In particular, no additional detectors are required, and the intensity can be derived very easily from the detector signal itself. Depending on the signal intensity determined from the last measurement, an appropriate value for the number of pulses to be integrated for the next measurement is then applied to an appropriate counter—for example in the form of hardware or software in the intensity control device 22, and therefore not illustrated in any more detail. These values may be continuous. Another option is to adapt the number of pulses to be integrated in steps (for example doubling/halving: 1-2-4-8-16-32-65-128-256-MAX number of pulses or additive increase/subtraction 1-31-61-91- . . . ). However, it is also possible to derive a direct proportional factor from the measured intensity value and the desired value.

FIGS. 8a and 8b show various options for reading the detector 35. In the example, different numbers of laser pulses 81a, 81b, 81c are recorded for three successive measurements. 82a, 82b and 82c denote the total integration times for the first to third measurements.

As can be seen from FIG. 8a, the total integration time 82a, 82b, 82c of the detector 35 may, in a first procedure, be predetermined to be fixed independently of the number of laser pulses to be integrated and the length of the pulse train to be integrated (for 81a, 81b, 81c). FIG. 8a therefore shows a procedure for reading the detector 35 using a fixed reading clock cycle.

FIG. 8b shows a procedure for reading the detector 35, in which the total integration time 82a, 82b, 82c is dependent on the measured signal intensity. As in FIG. 8b for the measurement annotated b, provided that the intensity is adequate, even a small number of laser pulses 81b may be sufficient to achieve the desired intensity, as a result of which the total integration time 82b (exposure time) may be shortened in comparison to the first measurement, with the total integration time 82a. The reading process is then carried out after reaching the desired intensity or after reaching an intensity which can be expected on the basis of the previous measurement. The total integration time 82a, 82b, 82c may be limited by a predetermined maximum time.

In a LIDAR system as described above, not only the change in the speed but the speed itself is often intended to be measured. It is not sufficient simply to measure the rate of change of the interference signal for this purpose. For example, in order to measure the speed itself, the change in the interference signal with respect to a reference point (for example known speed or speed equal to zero) is measured. One option using the direct reception Doppler LIDAR apparatus 10 described here is essentially to couple a portion of the transmitted laser light—laser beam 15—directly (that is to say without transmission into the atmosphere) into the detector arrangement 12. Since this portion of the laser light is not scattered on particles 17a, 17b, 17c which are moving relative to the system, the Doppler shift here is 0. The signal can therefore be used as a null-point reference signal.

In one embodiment of the measurement method described here, this signal is now obtained by passing a portion of the transmitted signal to the detector 35 and by now choosing the number of detected laser pulses 51 such that the detector 35 is not saturated. The directly supplied signal is typically considerably more intense than the signal obtained by back-scattering from the atmosphere, as a result of which the solution described here also makes a significant contribution in this case to prevention of detector saturation and therefore to obtaining a good reference signal. This measurement of the reference signal can now be carried out periodically or randomly throughout the entire measurement process of the LIDAR measurement.

What is claimed is:

1. A method for Doppler light detection and ranging (LIDAR) measurement of speeds, the method comprising:
directing laser pulses at a medium to be measured at a repetition rate of a plurality of laser pulses per measurement; and
operating a detector to detect pulses of radiation, which are emitted by the medium as a result of exposure of the medium to the laser pulses, at a detection rate, the operating including controlling the detector to estimate an intensity of the measurement signal from a previous profile of a measurement signal intensity, select a number of the pulses of radiation which are to be integrated by the detector based on the estimate, and integrate the number of the pulses of radiation per measurement; and
wherein the repetition rate is at least one order of magnitude greater than the detection rate, and the laser pulses for each measurement are transmitted at a frequency of greater than or equal to 1 kHz.

2. The method as claimed in claim 1, wherein
the controlling is performed based on intensity of the radiation pulses emanating from the medium.

3. The method as claimed in claim 1, wherein
the controlling includes controlling a total intensity of the pulses of radiation received by the detector by controlling the number of the pulses of radiation which are integrated by the detector.

4. The method as claimed in claim 1, wherein the controlling comprises at least one of the following:
controlling a laser source to transmit a variable number of the laser pulses;
operating a first switching device which is connected downstream from the laser source to control a number of the laser pulses that are directed at the medium;
controlling the detector to refrain from integrating a certain number of the pulses of radiation; and
operating a second switching device to limit a number of the pulses of radiation that are received by the detector.

5. The method as claimed in claim 1, wherein the controlling is performed to obtain a signal intensity below an overdriving threshold of the detector.

6. The method as claimed in claim 1, wherein the controlling includes at least one of the following:
comparing a current measured value of an intensity of the pulses of radiation being detected by the detector with a predetermined upper threshold value, and reducing the number of the pulses of radiation to be integrated for a subsequent measurement if the current measured value is above the upper threshold value; and
comparing the current measured value with a predetermined lower threshold value, and increasing the number of the pulses of radiation to be integrated for the subsequent measurement if the current measured value is below the lower threshold value.

7. The method as claimed in claim 6, wherein the comparing operations are performed repeatedly in successive measurements until the current measured value is between the upper and lower threshold values.

8. The method as claimed in claim 6, wherein the controlling includes varying the number of the pulses of radiation which are integrated by the detector based on one of the following:
a constant factor; and
in proportion to a deviation from a predetermined ideal value.

9. The method as claimed in claim 1, wherein
the controlling is performed for each of a plurality of measurement channels.

10. The method as claimed in claim 1, wherein
the controlling is performed separately from measurement channels for any of a plurality of possible reference channels.

11. The method as claimed in claim 1, further comprising one of the following
reading the detector at a constant detection rate independently of the number of integrated pulses of radiation; and
reading the detector after a predetermined intensity of the detected pulses of radiation has been reached.

12. The method as claimed in claim 11, wherein the reading of the detector after the predetermined intensity has been reached is performed after a predetermined time period has elapsed, and if the predetermined intensity has not been reached the reading of the detector is performed before the predetermined time period has elapsed.

13. The method as claimed in claim 1, further comprising
determining a determined number based on a number of transmitted laser pulses or a number of pulses of radiation which are to be integrated, and
determining an amplitude of a signal representing the detected pulses of radiation based on the determined number and an intensity of the detected pulses of radiation.

14. The method as claimed in claim 1, wherein
the directing and operating are performed by a Doppler LIDAR apparatus to increase a dynamic range of the Doppler LIDAR apparatus.

15. The method as claimed in claim 1, wherein
the medium includes an atmosphere outside of an aircraft, and the directing and operating are performed to measure at least one of air speeds for predictive measurement of turbulence, cross winds and vortex trains in front of the aircraft.

16. A direct reception Doppler light detection and ranging (LIDAR) apparatus, comprising:
a laser source configured to transmit a plurality of laser pulses to a medium to be measured;
a detector configured to receive pulses of radiation emitted by the medium when exposed to the laser pulses; and
a controller configured to estimate an intensity of the measurement signal from a previous profile of a measurement signal intensity, select a number of the pulses of radiation which are to be integrated by the detector based on the estimate, control the detector to integrate the number of the pulses of radiation per measurement, and determine a speed of the medium based on an integration of the pulses of radiation received by the detector.

17. The direct reception Doppler LIDAR apparatus as claimed in claim 16, wherein
the controller is further configured to control a number of the laser pulses transmitted by the laser source.

18. The direct reception Doppler LIDAR apparatus as claimed in claim 17, wherein
the laser source includes a Q-switch that the controller is configured to control the number of laser pulses transmitted.

19. The direct reception Doppler LIDAR apparatus as claimed in claim 16, wherein the controller is further configured to control the detector to refrain from integrating certain of the received pulses of radiation.

20. The direct reception Doppler LIDAR apparatus as claimed in claim 16, wherein
the controller is further configured to control a switching device, which is arranged downstream from the laser source, to select a number of the laser pulses directed at the medium.

21. The direct reception Doppler LIDAR apparatus as claimed in claim 16, wherein
the controller is further configured to control a switching device to select a number of the pulses of radiation to be received by the detector.

22. The direct reception Doppler LIDAR apparatus as claimed in claim 20, wherein
the switching device includes at least one of an electrooptical switch, an electromechanical switch and a fiberoptic switch.

23. The direct reception Doppler LIDAR apparatus as claimed in claim 19, further comprising
a microchannel plate provided in front of the detector and configured for control by the controller.

24. The direct reception Doppler LIDAR apparatus as claimed in claim 16, further comprising
a detection device configured to determine a determined number representing at least one of a number of the laser pulses emitted by the laser source and a number of the pulses of radiation received by the detector per the measurement cycle; and
an evaluation device configured to determine a signal intensity representing an intensity of the received pulses of radiation based on the determined number and an intensity of the received pulses of radiation as measured by the detector.

* * * * *